United States Patent [19]
Johnson et al.

[11] 4,175,674
[45] Nov. 27, 1979

[54] DEVICE FOR SINGULAR DISPENSING OF PACKAGED ARTICLES

[75] Inventors: Ralph W. Johnson, New Brighton; Emil D. Burrs, St. Paul; Gary L. Smith, Minnetonka; Ronald G. Freund, Bloomington, all of Minn.; Edward Patula, Rhinelander, Wis.

[73] Assignee: Total Systems, Inc., Minnetonka, Minn.

[21] Appl. No.: 827,246

[22] Filed: Aug. 24, 1977

[51] Int. Cl.² .............................................. B65G 65/60
[52] U.S. Cl. ..................................................... 221/88
[58] Field of Search ................. 221/91, 124, 296, 298, 221/299, 300, 293, 295, 297, 89, 253, 88

[56] References Cited

U.S. PATENT DOCUMENTS

| | | | |
|---|---|---|---|
| 520,243 | 5/1894 | Randall, Jr. | 221/91 X |
| 2,351,779 | 6/1944 | Niewoehner | 221/91 X |

Primary Examiner—Stanley H. Tollberg
Attorney, Agent, or Firm—James R. Cwayna

[57] ABSTRACT

A movable console unit for dispensing drugs or other selected articles while retaining other carried articles therein. The device includes downwardly and forwardly directed ramps for loading the articles and delivery of the articles. A number of the ramps are arranged in vertical relation to one another and a selector belt is provided for each of the sets of ramps. The selector belt is selectably movable about the entire ramp structure and is provided with two openings which are maintained in alignment with the rear and forward end of one of the ramps such that articles may be loaded into or delivered from one such ramp in each vertical set. A stop mechanism is provided to extend across the front portions of the ramps and this stop mechanism permits discharge of one article from the ramp with which the opening of the selector belt is aligned. A selector switching arrangement is provided for each of the vertical ramp sets for proper alignment of the belt opening to the front of the ramp and a collector tray is positioned to catch and retain the articles upon delivery from the ramps. A protective front and rear door is provided to prevent removal of the articles unless properly delivered.

9 Claims, 6 Drawing Figures

DEVICE FOR SINGULAR DISPENSING OF PACKAGED ARTICLES

Field of the Invention

This invention relates generally to dispensing devices having article selecting means and more specifically to a selective dispensing device providing for the dispensing of articles of various sizes with a programmable selection arrangement which provides for proper selection without visual inspection and which includes means for delivering one selected article while retaining the other articles.

BACKGROUND AND OBJECTS OF THE INVENTION

Applicants' device consists of a device directly related to the controlled dispensing of articles and which is particularly designed for the dispensing of drugs and medications to hospital in-patients. At present, drug and medication dispensing for such patients includes a qualified attendant to carry articles to the patients or for the ambulatory patients to come to a dispensing clinic. In either instance this process is time consuming and very often results in the patient receiving the wrong or excessive dosages. With the device that applicants' provide, a mobile unit is provided which will carry the entire medication for a group of persons and the unit is programmed or a program and selector arrangement is provided such that the operator thereof simply selects the proper arrangement of switch positions and the drugs or other medication is delivered. This arrangement does not permit the operator to visually inspect the material being delivered until delivery.

In use, the unit will be filled by one person and the selection and delivery made by another person with the programming for each individual recipient being provided by still a third person, primarily the patients doctor. With the problems of narcotic and other drug misuses, this system will provide a checking arrangement and will insure delivery of the proper medication to a patient.

The prior art illustrates numerous vending machine devices which provide various means for selecting a desired article, delivery of the same and advancement of the next article for distribution. These devices normally include arrangements where the article storage requires mechanical advancement and the product is normally visible to the purchaser or user. With applicants' unit, the advancement of the supply of arcticles is obtained through a gravity feed and the articles are not normally visible nor accessible to the recipient. With the device as provided herein the alignment of a feeding or loading door with a delivery door and the means for maintaining this alignment with a selected article storage section are also believed to be new.

It is therefore an object of applicants' invention to provide a dispensing device particularly directed to the dispensing of drugs or other medications.

It is a further object of applicants' invention to provide a dispensing device wherein the selection of articles for delivery is remotely programmed such that the recipient does not have a visual inspection of the article prior to delivery.

It is still a further object of applicants' invention to provide a dispensing device wherein the articles to be delivered from the unit are advanced into delivery position by gravity and wherein the delivery mechanism permits the delivery of one such selected article while physically retaining the remaining articles.

It is yet a further object of applicants' invention to provide a mobile dispensing device arranged to store and delivery a number of selected articles which may be of various sizes.

It is still a further object of applicants' invention to provide a tamper proof device for the dispensing of drugs and other medications for patients requiring the same.

These and other objects and advantages of applicants' invention will more fully appear from the accompanying description made in association with the accompanying drawings in which the same numeral or identification is used to designate the same or similar parts throughout the several views, and in which.

Figure 1:
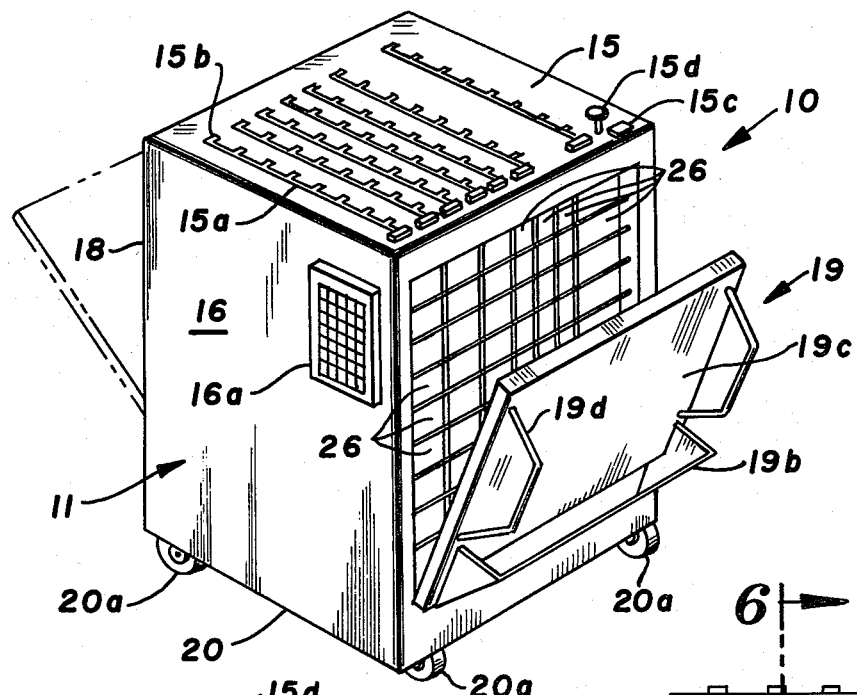
FIG. 1 is a perspecitive view of the mobile drug or medication dispensing device embodying the concepts of applicants' invention and illustrating the front and rear doors thereof in phantom lines.

In accordance with the accompanying drawings applicants' dispensing device is generally designated 10 and basically includes an outer housing 11, an internal storage section 12 and a loading and delivery control section 13. Obviously these three sections must be correlated and designed for correlated operation, but for purposes of description it will be possible to more thoroughly describe the unit by individually describing these sections and thereafter correlating the same.

The housing 11 includes not only the exterior covering portions including a top 15, left and right side 16, 17, rear 18, front, 19 and bottom 20 but the various internal framing portions necessary to support the other sections of the unit. Such framing sections may be considered to be integral with the covering portions or may be provided of separate support elements according to the designers choice.

The top section 15 includes a generally flat member having a plurality of longitudinally slots 15a therein to receive sliding selector knobs or locating switches in position therealong by providing a plurality of transversely extending switch receiving notches or the like 15b. This arrangement provides a means of locating the selector switches for the proper selection of material from the storage section 12. It should be noted at this time that a selector keyboard is provided on the left side of the unit and is designated 16a. This keyboard could be located on the top 15 and when such keyboard, selector mechanism is incorporated into the device, it would be possible to eliminate the mechanical switching arrangement incorporating the slots 15a and notches 15b.

The disclosure of this application will primarily be direct to mechanical operation.

Two further elements are illustrated on top 15 and these include an actuating button 15c and an actuating knob 15d both of which are interconnected to the delivery control section 13 for actuating the same.

The rear 18 of the housing 11 includes a lockable door panel to allow access into the rear of the device 10 for filling the same.

As stated, and as shown, a keyboard 16a is illustrated on the left side of the device but in normal operation, the sides 16, 17 are flat panel sections.

Front surface 19 includes a swingable, hinged and lockable door panel 19a which panel includes a receiving bin 19b at the lower edge thereof with a guard or cover portion 19c arranged in spaced relation above the bottom of bin 19b and spaced with respect to the front of the housing such that articles may be delivered from the storage section 12 and into the bin but that access to such articles is limited to their retrieval from the bin 19b, the spacing between the guard portion 19c and the bin 19b not normally permitting a person to so place their hand as to physically extract articles from the storage section 12.

The front of the unit is also provided with extending handles 19d, 19e to assist in the mobility of the unit.

Casters 20a are provided on the bottom 20 of console 10 such that the same may be easily rolled from location to location or from room to room.

The concept of this console or outer housing is to provide a tamper proof unit with the controls for the selection and delivery of articles stored therein arranged on the exterior of the unit with the primary access being through locked panels.

The internal storage section 12, as the same is described herein, consists simply of a plurality of individual racks or tray sections each of which is designated 25 and each of which is designed to retain an article containing packet thereon and therewithin. These tray sections could be individually formed U-shaped sections having a bottom and upstanding sides or could be formed side and partial forming L-shaped brackets arranged transversely to provide the track upon which the packets will flow downwardly from the rear to the front of the device.

Figure 2:
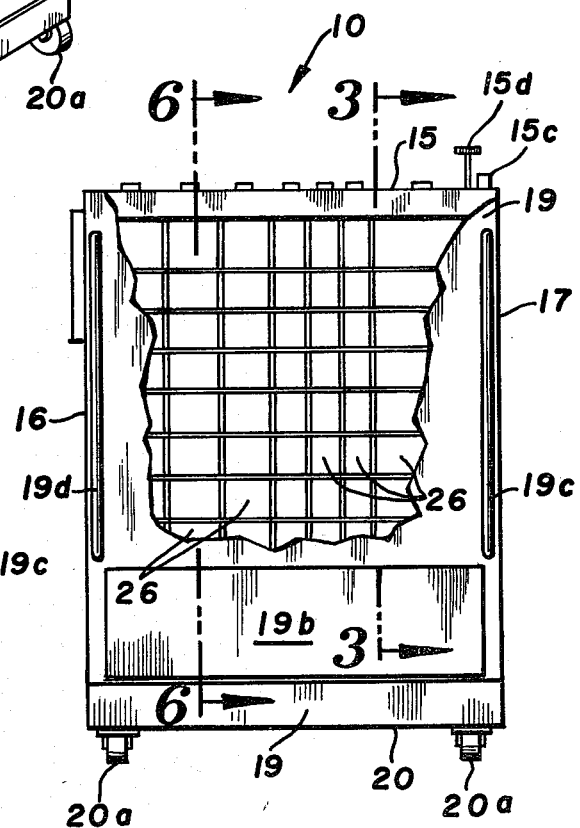
FIG. 2 is a front elevation of the console unit having the front door thereof removed to illustrate the interior portions thereof.
Figure 3:
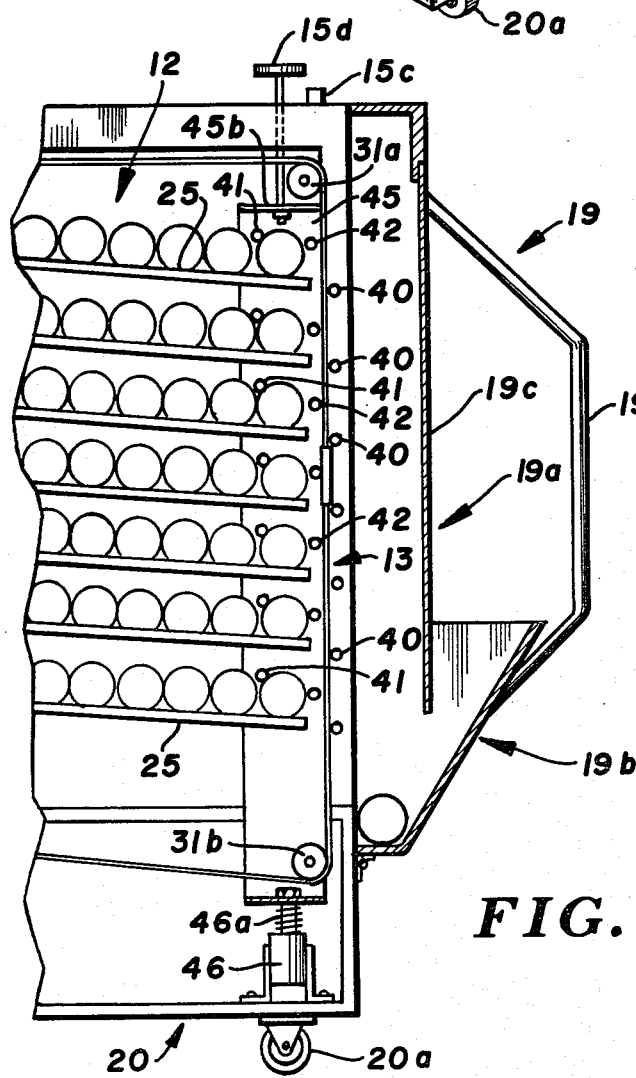
FIG. 3 is a vertical section taken substantially along Line 3—3 of FIG. 2.

As illustrated in FIG. 3, a plurality of commonly, transversely sized trays or guide tracks are provided in vertical relation to one another such that the packets of any certain size or containing the same article may be arranged in vertical relation to one another and be controlled by the delivery control section 13. As illustrated in FIGS. 1 and 2, a plurality of the individual vertically arranged tray sections, each such total vertical section being designated 26 are arranged in side by side relation across the transverse dimension of the unit and the individual guide racks or tray sections are provided for each such section. With this arrangement, it should be obvious that many individual tray or guide rack arrangements are provided within the basically rectangular frontal dimension of the unit. It should be particularly pointed out that this same track and packet retaining configuration could be provided with vertical dividers and downwardly sloping carrier elements therebetween without departing from the scope of the invention.

Figure 6:
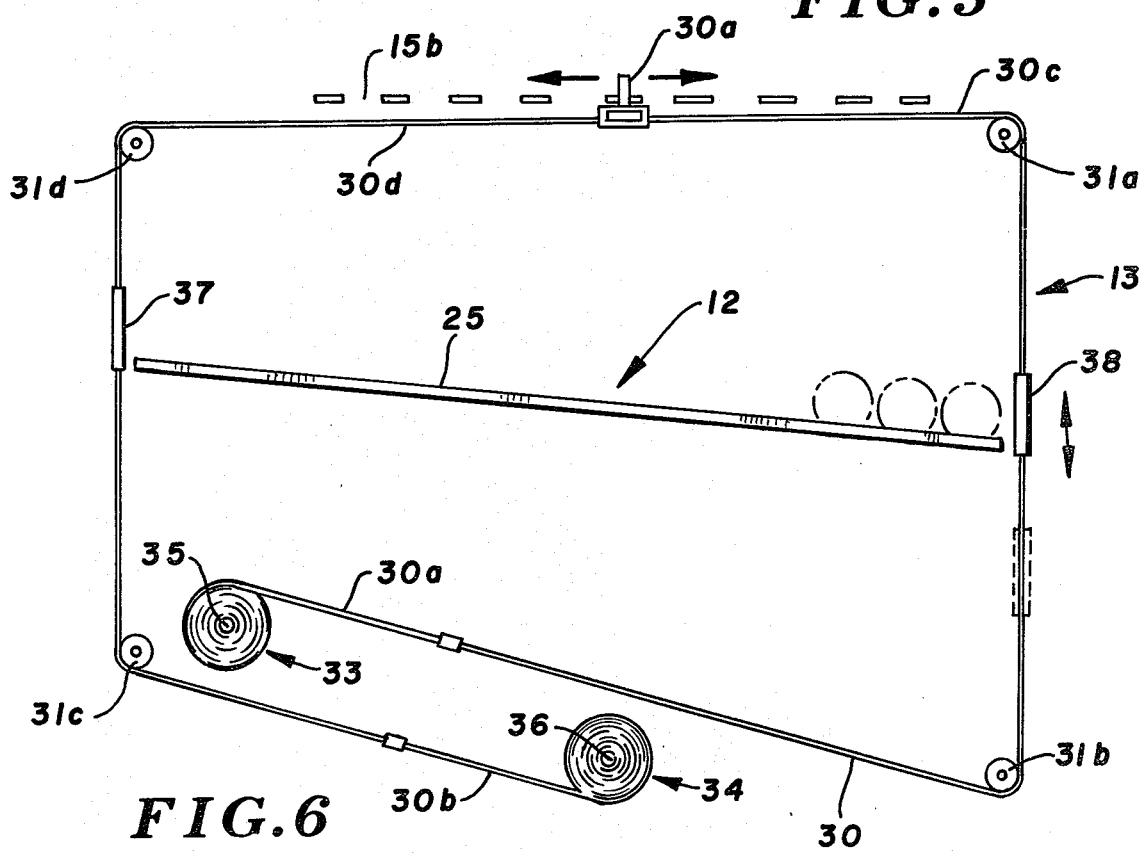
FIG. 6 is a vertical elevation taken substantially along Line 6—6 of FIG. 2 illustrating the operative and control portions of a typical loading, storage and delivery arrangement which view is applicable to each of the vertical sections through the console.

The illustration of FIG. 6 shows a single rack or tray arrangement and illustrates the same as extending from the rear to the front of the device such that packets ontained thereon will be loaded from the rear of the device and be delivered to the delivery or front of the device through a gravity feed.

A portion of the delivery section 13 which permits the loading or delivery of articles from a single rack or tray assemby is illustrated in FIG. 6 in a relatively schematic form. As illustrated in FIG. 6, a belt member 30 is provided to substantially encompass the interior storage section and four individual roller members 31a, 31b, 31c, 31d are provided to properly maintian the belt with respect to the trays 25. It should be pointed out that one such belt 30 is provided for each such vertical set of racks or trays 25.

Figure 5:
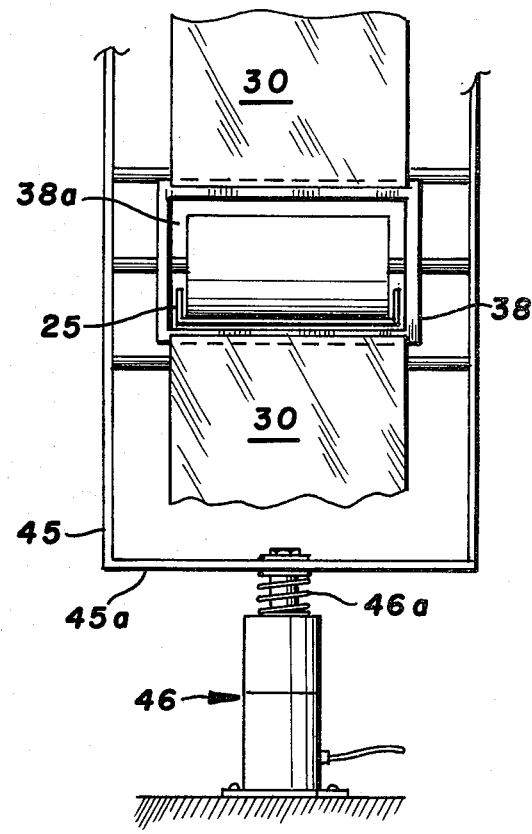
FIG. 5 is a vertical section taken substantially along Line 5—5 of FIG. 4.

The ends of belt 30, consisting of ends 30a, 30b are attached to take-up coils or coiled spring devices which are secured to common shafts extending across the device. The coils are designated 33, 34 and the shafts as 35, 36. The second ends 30c, 30d of the belt are commonly connected to the aforementioned selector switch 30e, or an intermediate portion of belt 30, if the same is not broken or split, is connected to switch 30e and the movement of the switch 30e through the slots 15 and notches 15b of the top 15 will cause movement of the belt 30 against the respective take-up mechanisms 33, 34 to insure alignment of openings 37, 38 provided on the belt 30. The opening 37 is referred to as a loading frame and the opening 38 is referred to as a delivery frame. The particular structure of these frames 37 or 38 is illustrated in FIG. 5 which illustrates the same as being substantially rectangular in shape with a rectangular opening therein. The opening 38a or 37a (not shown) is provided in accordance to the size of the article to be carried within the rack or tray assembly such that articles may be received on the same through frame 37 and delivered therefrom through frame 38.

It should be obvious that as the switch element 30e is moved through the slot 15a and into one of the selected notches 15b thereof that the frames 37, 38 must be positioned in alignment to one of the racks or trays such that the same may be filled or articles delivered therefrom. It should be noted, however, and as illustrated in FIG. 3, roller member 31b is positioned a predetermined distance from the lower rack or tray 25. This will allow the front delivery frame 38 to be positioned below the storage area and thus will not present the delivery frame in alignment to allow any articles to be delivered from the unit.

To this point, it should be obvious that, with the particular positioning of the selector switch 30a, the loading frame 37 will be in alignment with one of the racks or trays 25 and filling thereof may be obtained through the rear door of the unit and it should also be obvious a selection or positioning of the front frame 38 may be made within any vertical set of trays such that a number, limited only by the number of vertical sets, of articles may be delivered and that this delivery number allows for delivery of any article within a single tray within the vertical set. It should also be noted that it is not necessary to deliver from any of the vertical sets as all of the frames 38 could be positioned in the lowest nondelivery position.

Figure 4:
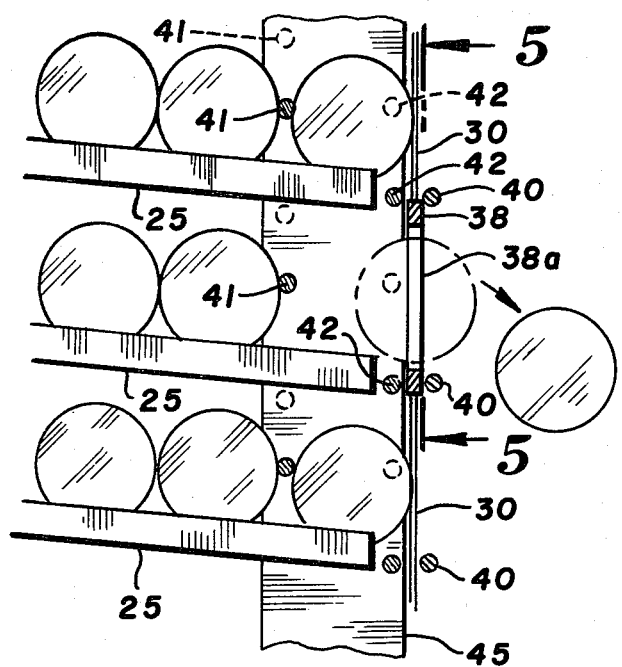
FIG. 4 is and enlarged view of a portion of FIG. 3 and illustrating the operations of delivery and article retention.

A further portion of the delivery control section 13 is best illustrated in FIGS. 3 and 4. As illustrated therein, a single article delivery control is provided. A first set of stationary belt retaining, transversely extending guards 40 are provided to extend acorss the frontal portion of each of the belts and normally maintain the same relatively close to the forward ends of the trays 25 such that, unless the frame 38 is positioned in alignment with the tray 25, the belt will hold the article against delivery. A second set of article retaining and release bars or guards 41, 42 extend transversely across the device and are carried at least at their ends by a vertically slidable frame structure 45 such that these members 41, 42 will move simultaneously upwardly and downwardly. As illustrated in FIGS. 3 and 4, the retaining guards 41 are spaced rearwardly from the release guards 42 a distance substantially equal to the packet located on the tray 25 and the retaining guard 41 is spaced vertically upwardly from the corresponding release guard 42 such that upon downward movement of the guards the release guard will be moved downwardly to allow the packet forward to a point where it is in engagement with the now retaining belt 30 which will hold the same from delivery or to a point forward for discharge through the frame 38 if the same is positioned with respect to the tray 25 with such downward movement bringing the retaining guard 41 to a position spaced upwardly from the tray 25 to prevent the next subsequent packet from being advanced. Upon upward movement of this set of guards, if the forewardmost packet was not released, the release guard 42 will force the forward packet and the stored packets rearwardly and the movement upward of the retaining guard 41 will permit such rearward movement.

It should be stated that by properly positioning the various guards including the belt 30, the belt retaining guard 40, the retaining guard 41 and the release guard 42 there will be minimal movement of the packets during this cycle unless the frame 38 is positioned for packet release and at such time, upward movement of the guards 41, 42 will allow the remaining packets in the storage tray 25 to move forwardly for subsequent delivery.

Strucutre to actuate the control bars and guards of the delivery section, in the form shown, include a manual and an electrical release or control.

As illustrated in FIG. 5, the frame 45 for the retaining and release guards 41, 42 may be of a U-shaped or rectangular configuration and the bottom leg 45a of the same may be attached to an electrically actuated solenoid 46. The aforementioned control elements including actuating switch 15c and knob 15d are utilized to conrtol the movement of the frame 45. The actuating knob 15d is attached to the frame 45 as at 45b and movement downwardly thereof will drive the frame downwardly where it will be returned by a spring mechanism 46a to the upward position. The actuating switch 15c will require electrical connection to the solenoid 45 and if this system is used, it whould be obvious that electrical power must be supplied to the unit. It should also be obvious that bearing means must be provided for proper vertical operation of the frame 45.

The use of applicants' device and the advantages thereof should be obvious to any person skilled in the art. The device is loaded from the rear of the unit by properly aligning the frame 37 with one of the storage trays 25 and this is continued until the machine is properly loaded with the articles to be dispensed and it should be obvious that such alignment must be obtained for each tray in each vertical arrangement. The selection of dispensing is done by moving the proper control switch in the proper vertical row to a proper tray within the row, the notches obviously being the controlling alignment factor. Upon alignment being accomplished, the actuating knob or switch is activated and the article will be released into the bin 15b for retrieval.

Ideally the user of the unit would be given a code for each patient and simply by moving the appropswitch in the appropriate row to the proper notch, the prescribed medication would be dispensed whether a single such article be dispensed or multiples be dispensed. It should be obvious in this useage, however, that only one article from any one tray may be dispensed at any one time but duplicity of the article may be obtained by providing an additional tray filled with the same article for dispensing simultaneously.

It should be obvious that applicants' have provided a unique dispensing device that may find its greatest use in the dispensing of pharmaceuticals and which will insure that the patient receive the proper dosages thereof.

What we claim is:

1. A dispensing device including:
   a. a support frame;
   b. a storage section carried by said support frame including at least one article storage and guiding means and arranged to deliver articles placed thereon from one rearward end thereof to the other forward end thereof;
   c. a belt member having at least one article passing opening therein;
   d. positioning means carried by said support frame and positioning said belt member with respect to said storage section for the control of the delivery of articles from the forward end thereof;
   e. means for shifting said belt to bring said article passing opening into registration with said forward end of said storage section for the delivery of articles therethrough upon registration of said opening with said storage section, said belt retaining the articles within said storage section when said opening is out of registration with said forward end of said storage means; and,
   f. article retaining means arranged in close association to said forward end of said storage means to normally retain articles therein and means for shifting said retaining means to permit articles to move forwardly upon shifting of said retaining means.

2. The structure set forth in claim 1 and said article retaining means including article delivery control means and article retaining means, said article delivery control means being arranged in close association to said forward end of said storage means, said article retaining means being spaced rearwardly therefrom such that upon shifting of the same said article delivery control means will permit delivery of one of the stored articles and said retaining means will prevent delivery of further such articls.

3. The structure set forth in claim 2 and the spacing between said delivery control means and said article retaining means being predetermined to normally receive one article therebetween.

4. The structure set forth in claim 3 and belt retaining means being spaced forwardly from said article delivery control means, said belt being arranged between therebetween.

5. The sturcture set forth in claim 1 and said belt member being provided with at least a pair of article passing openings, one such article passing opening being positionable with said forward end of said storage section for delivery of articles therefrom, the other of such article passing openings being positionable with said rearward end of said storage section, said opeings being simultaneously registerable with the same article storage and guiding means.

6. The structure set forth in claim 5 and said storage and guiding means being downwardly directed from said rear end to said forward end.

7. The sturcture set forth in claim 1 and said storage section including a plurality of horizontally arranged article storage and guiding means, each such storage section being provided with one of said belt members.

8. The structure set forth in claim 7 and said storage section including a plurality of vertically arranged storage and guiding means and each plurality of vertically arranged sections being arranged in side by side horizontal relation to provide a generally rectangular arrangment of such article storage and guiding means.

9. The structure set forth in claim 1 and said means for shifting said retaining means including electrically operated actuation means for moving said retaining means.

* * * * *